(No Model.) 9 Sheets—Sheet 2.
R. MORGENEIER.
AUTOMATIC DUPLICATING MACHINE.
No. 501,091. Patented July 11, 1893.
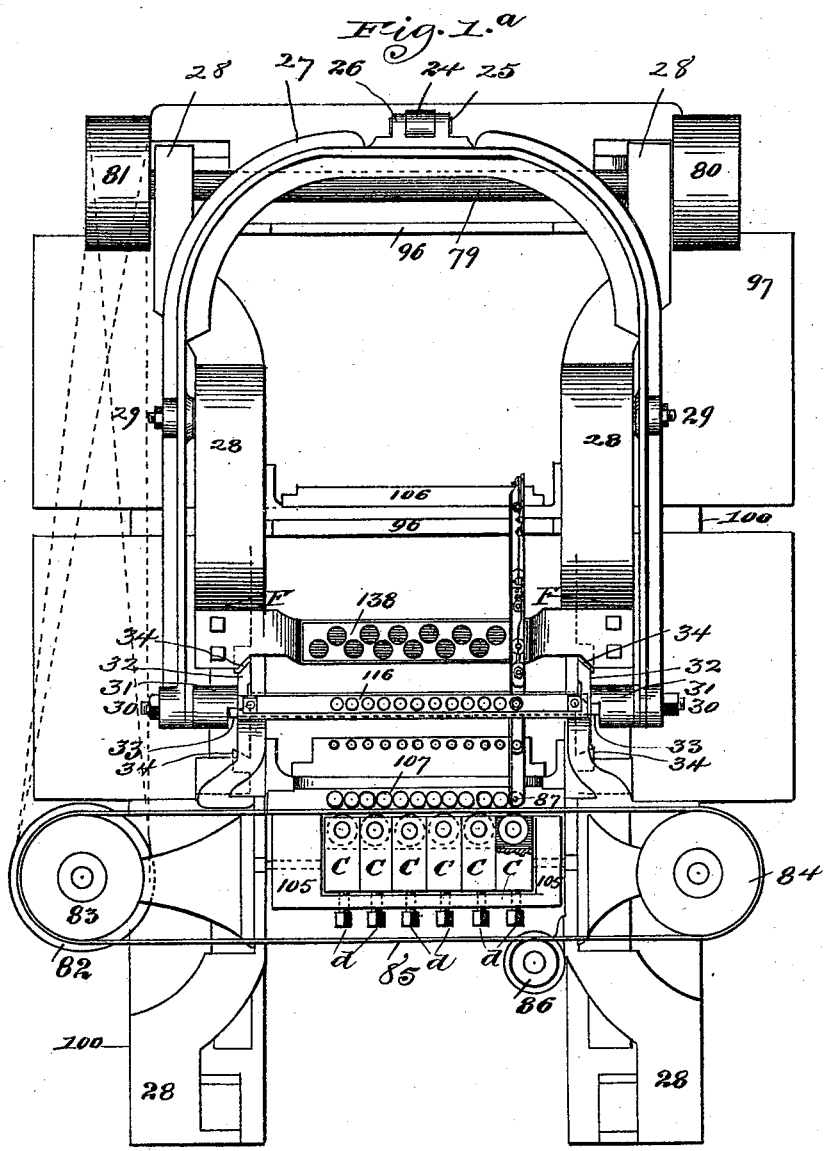

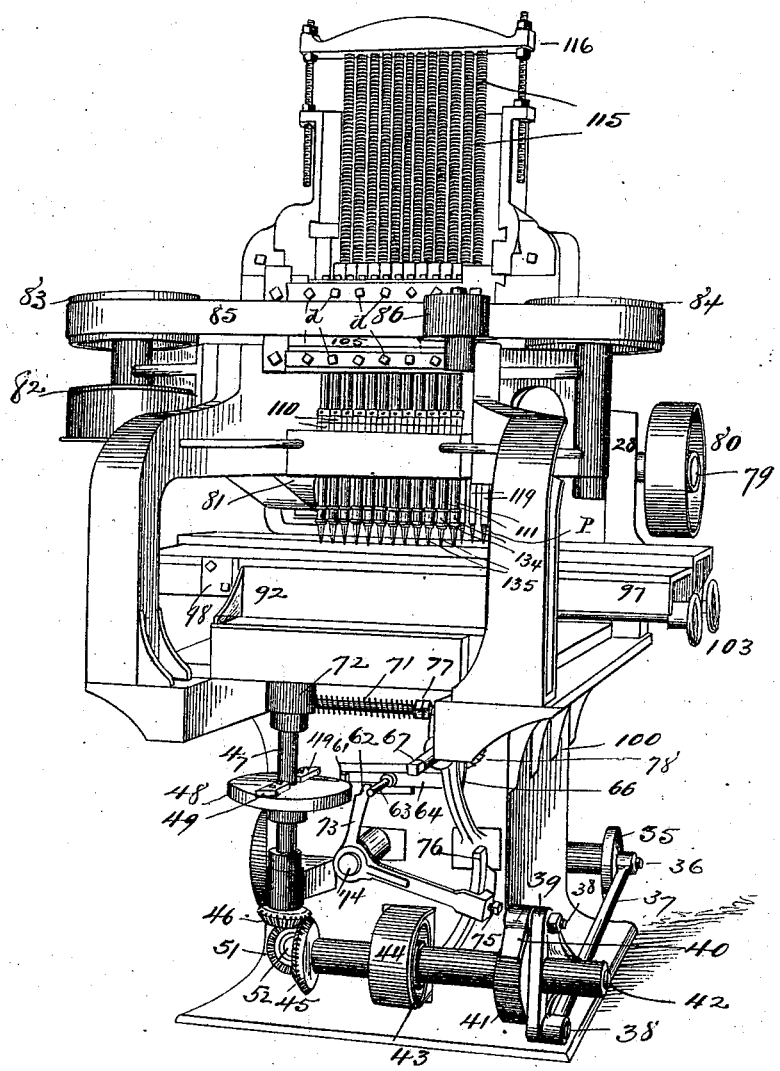

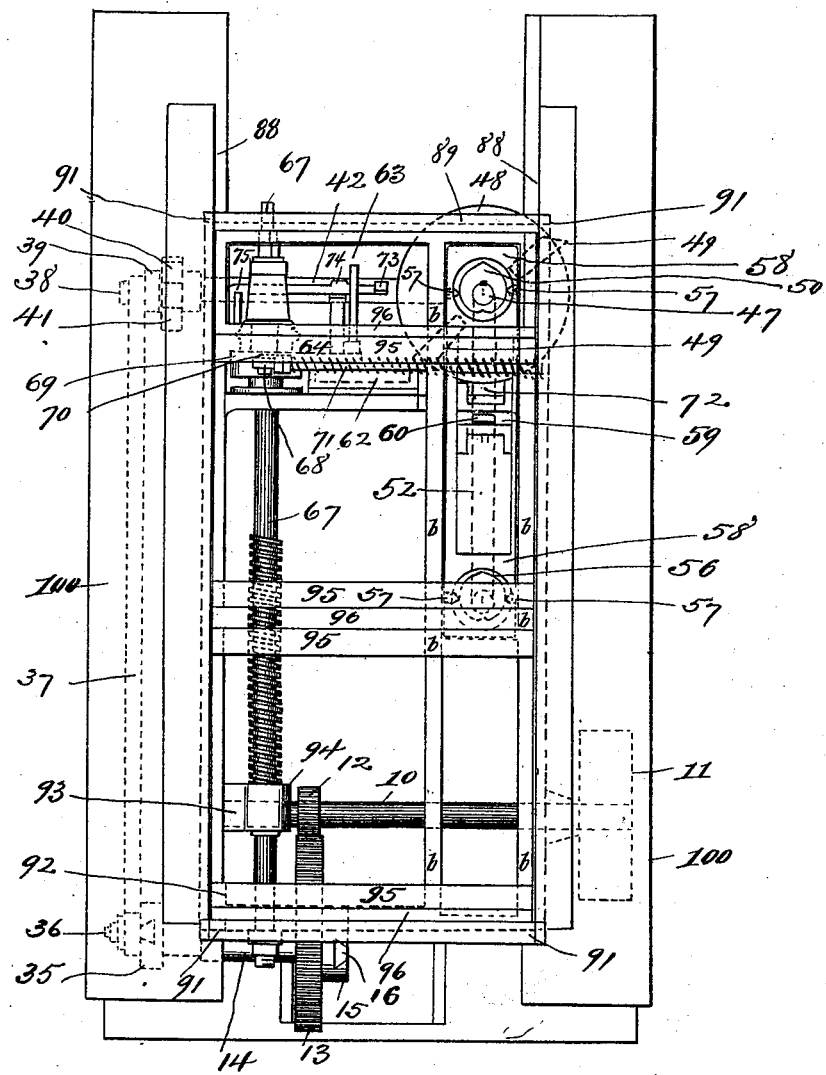

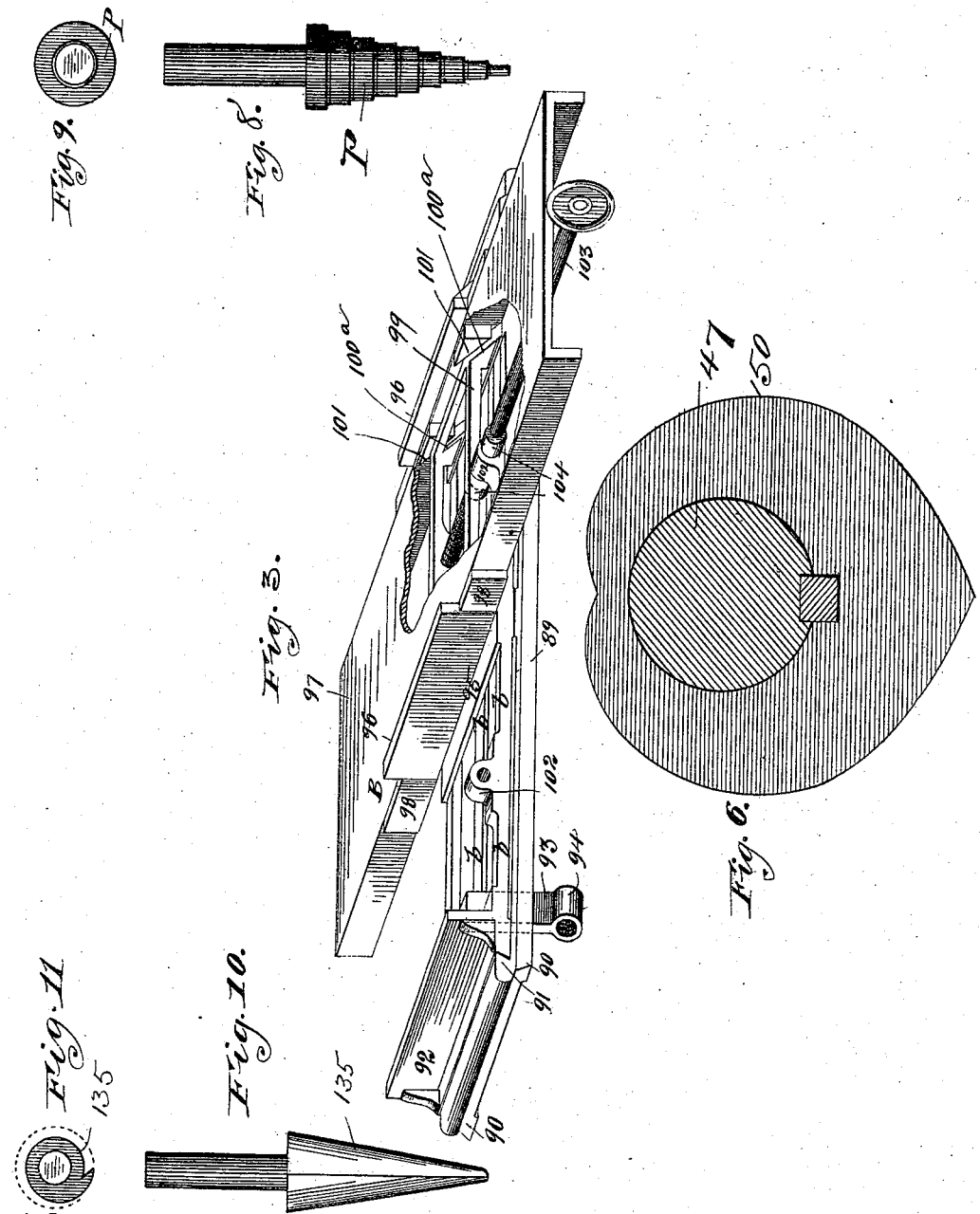

(No Model.)
9 Sheets—Sheet 5.
R. MORGENEIER.
AUTOMATIC DUPLICATING MACHINE.
No. 501,091. Patented July 11, 1893.
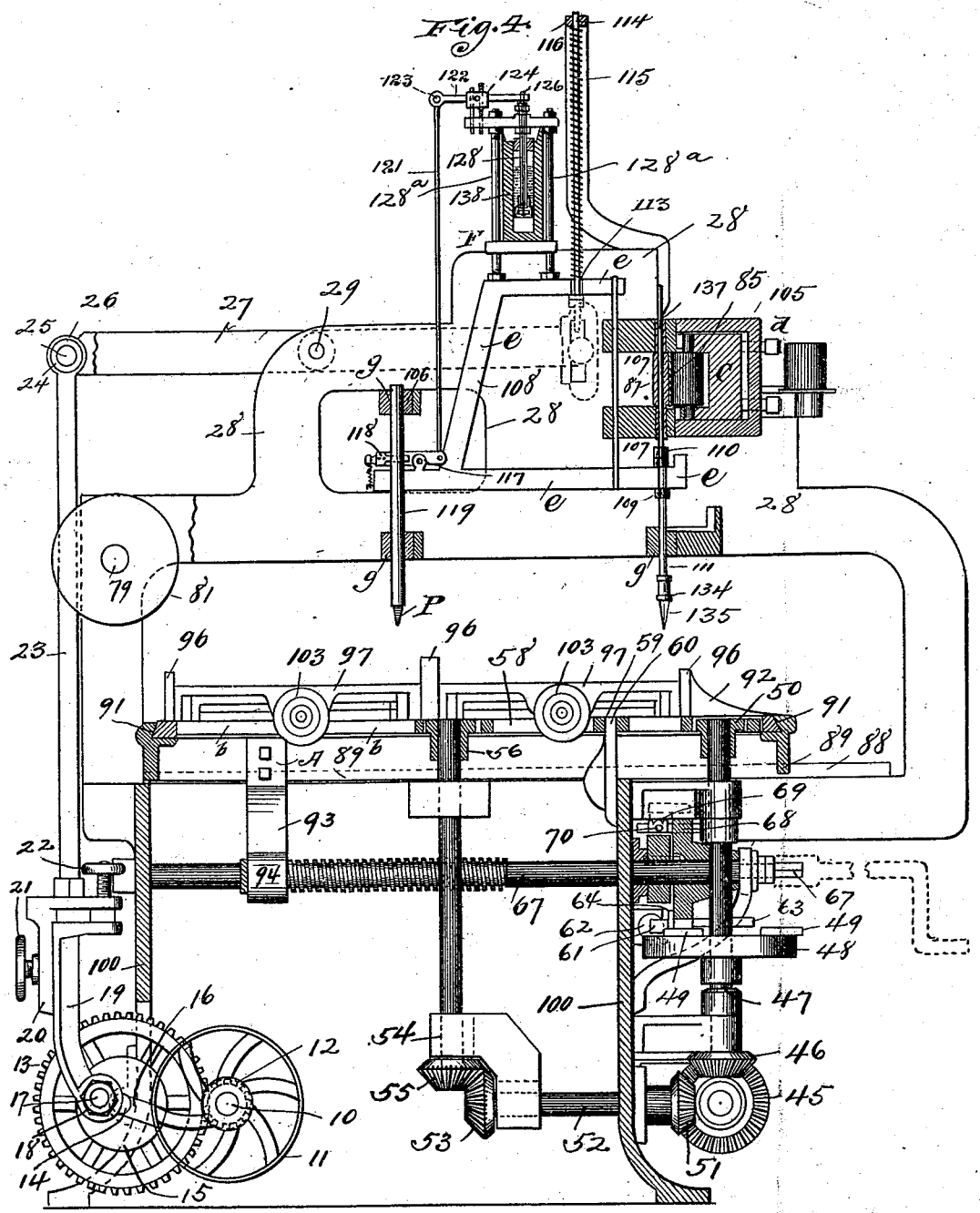
Witnesses,
T. S. Mann
T. C. Goodwin
Inventor,
Robert Morgeneier,
By Offield, Towle & Linthicum
Attys.

(No Model.)　　　　　　　　　　　　　　　　9 Sheets—Sheet 6.
R. MORGENEIER.
AUTOMATIC DUPLICATING MACHINE.
No. 501,091.　　　　　　　　　Patented July 11, 1893.
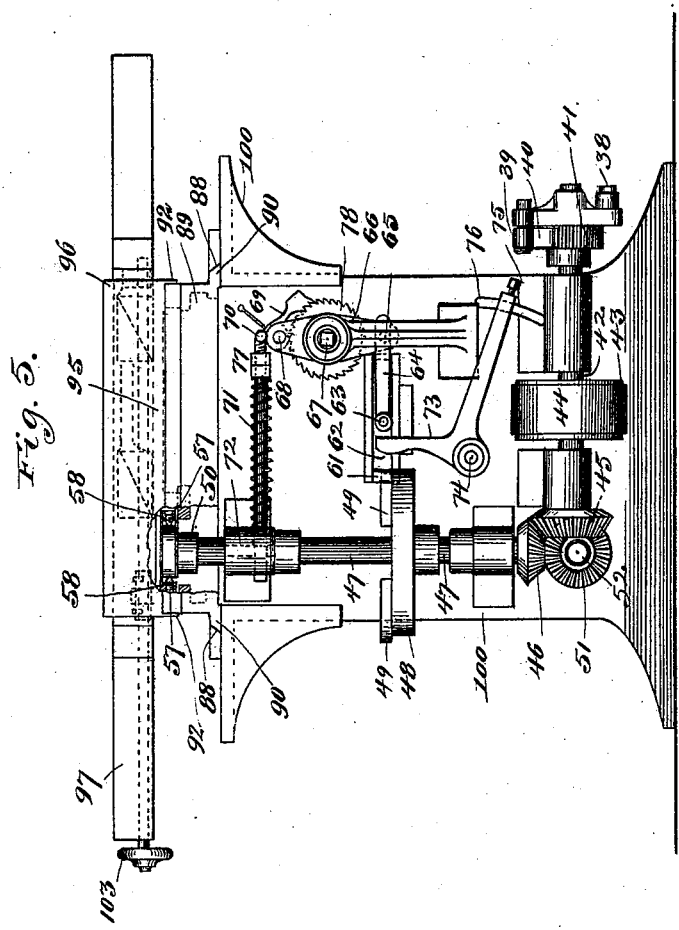

(No Model.) 9 Sheets—Sheet 7.
R. MORGENEIER.
AUTOMATIC DUPLICATING MACHINE.
No. 501,091. Patented July 11, 1893.
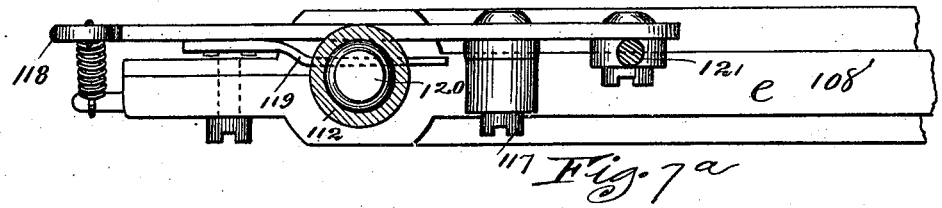
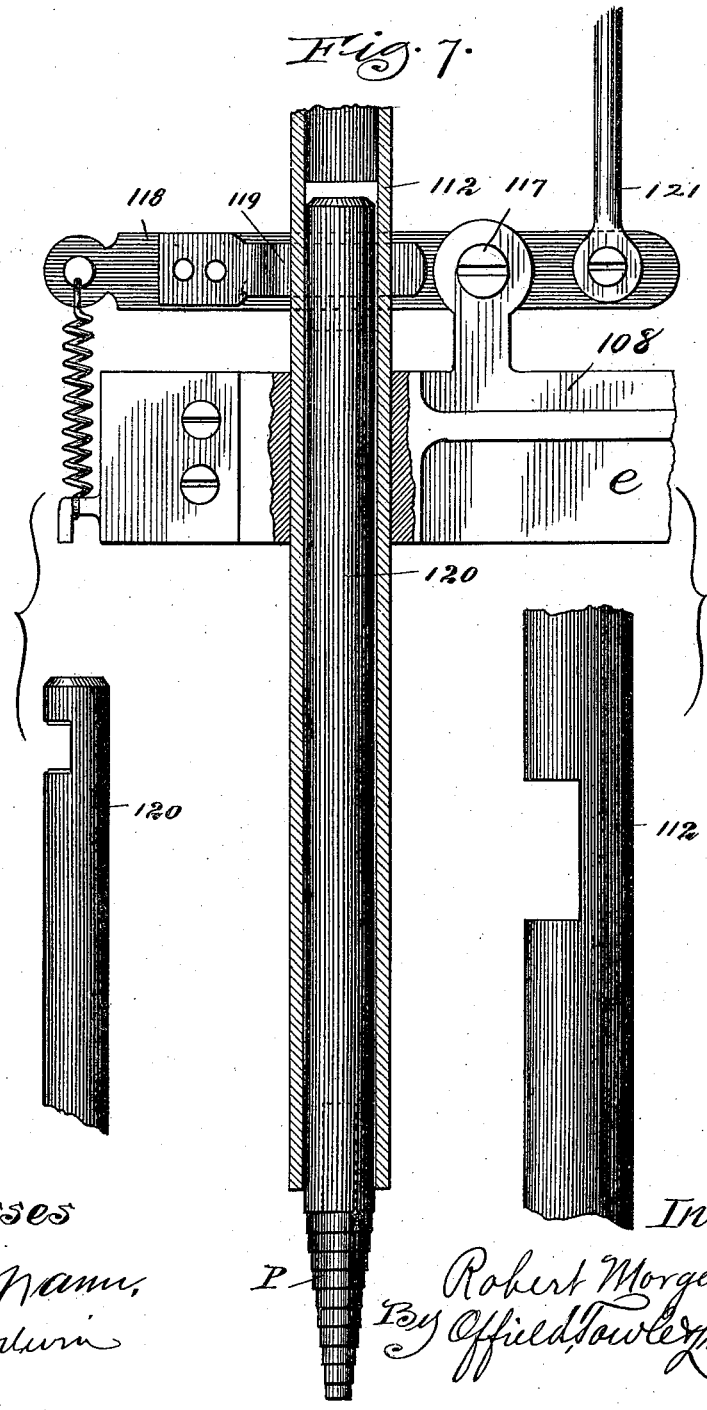

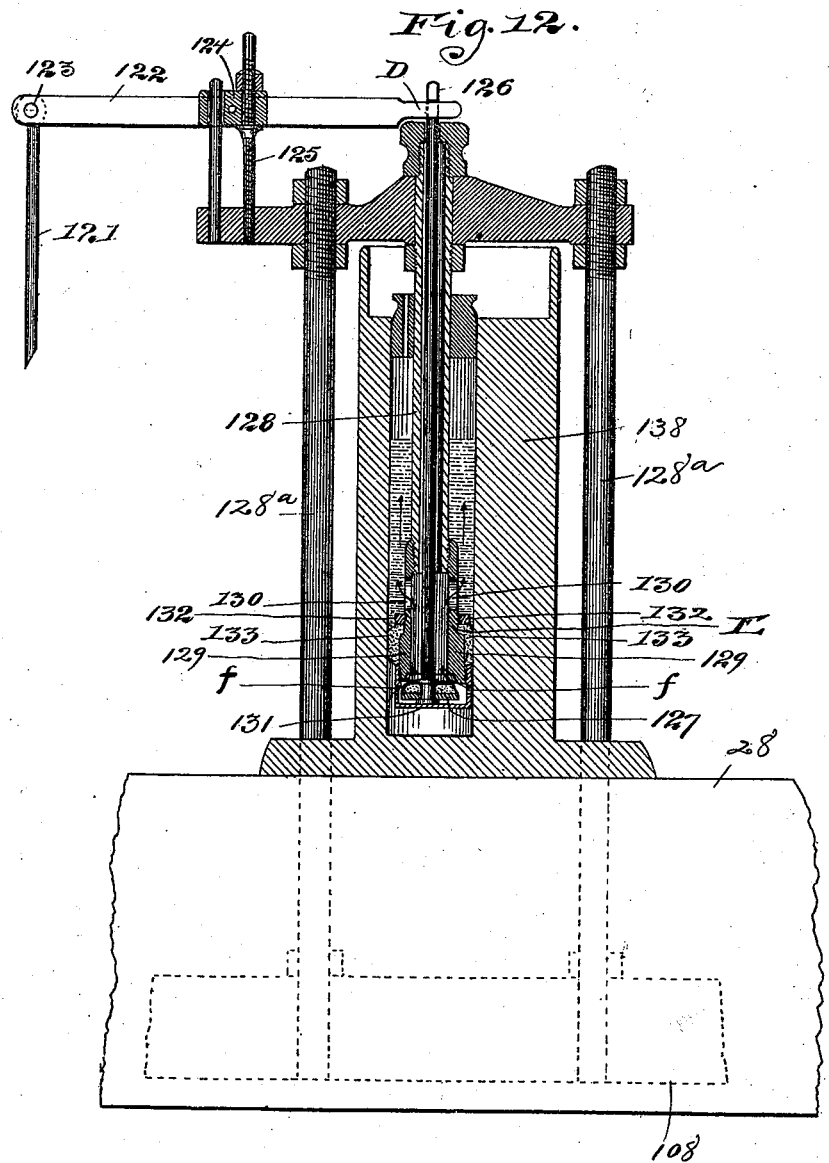

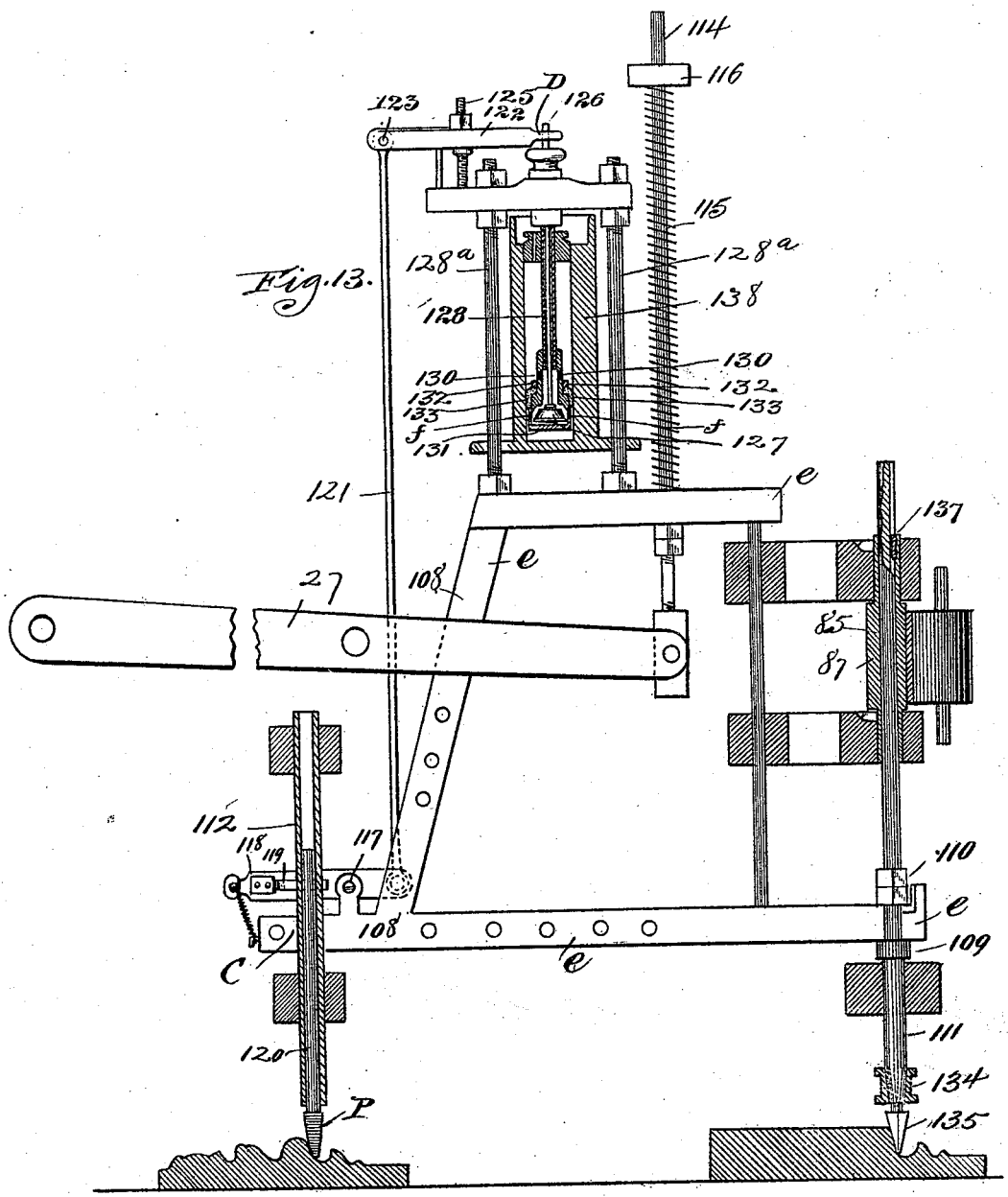

UNITED STATES PATENT OFFICE.

ROBERT MORGENEIER, OF WINONA, MINNESOTA, ASSIGNOR TO THE AMERICAN CARVING AND MANUFACTURING COMPANY, OF SAME PLACE.

AUTOMATIC DUPLICATING-MACHINE.

SPECIFICATION forming part of Letters Patent No. 501,091, dated July 11, 1893.

Application filed August 5, 1892. Serial No. 442,277. (No model.)

*To all whom it may concern:*

Be it known that I, ROBERT MORGENEIER, a citizen of the United States, residing at Winona, in the county of Winona and State of Minnesota, have invented certain new and useful Improvements in Automatic Duplicating-Machines, of which the following is a specification.

This invention relates to a duplicating or reproducing machine and is an improvement upon the machine described in Letters Patent No. 456,423, dated July 21, 1891.

The object of the invention is to provide a machine, automatic in its operations, whereby the contour of surfaces, whether regular or irregular, may be reproduced, for example, such contours as are presented by a carved panel, a sculptured figure, or any concrete object the size of which comes within the structural capacity of the machine and the composition of which offers sufficient resistance to the mechanism operating thereon to permit of a perfect duplication thereof. In a machine of this character there is necessarily employed material and pattern holders, a tool and mechanisms for controlling the action of the tool.

In the machine described in the patent before mentioned there is employed vertically and horizontally movable pattern and material holders, a series of horizontally movable frames having mounted therein rotating cutters or bits and independently movable guide fingers adapted when brought into contact with the surface of the pattern to actuate a tripping mechanism whereby the movement of the frame and the operation of the cutter are controlled. There is also employed in the machine described in said patent a standard adapted for connection with each frame in the series, said standard reciprocating at regular intervals and through a predetermined distance and the several frames, being controlled by the action of their respective guide fingers, commence their reciprocations with the standard but are released therefrom at irregular intervals due to the action of their respective guide fingers upon the surface of the pattern and are returned to their normal position by the standard.

In the machine of the present invention there are employed horizontally arranged pattern and material holders which are movable in two directions in the same plane; a series of frames vertically arranged each carrying a guide finger and a revoluble cutter; a vertically reciprocating cross head by which the frames are normally supported and returned to their normal position after each actuation; and means controlled by the guide fingers for arresting the movement of the frames without interfering with the travel of the cross head. This arrangement of the parts permits of counterbalancing the cross head and the weight of the frames carried thereby; furnishes a firm support for the material and pattern holders and permits of applying to them convenient means of adjustment; renders the machine compact; tends to simplicity and economy of construction, and places all of the operative parts of the machine in view and of easy access to the operator. The power required to drive the machine organized in accordance with this improvement is also reduced while the capacity of the machine is increased and a better and more perfect duplication can be effected than with previous constructions. By the provision of a simple adjusting device, which will be hereinafter more particularly described, the necessity for having the several cutters of exactly the same length is obviated. The means which I have provided for arresting the movement of the frame toward the work and which is hereinafter termed the "checking mechanism" are novel and of great importance in the practical operation, as such mechanism permits of a greater speed on the part of the machine, absolutely controls the cutter frames without shock or jar and allows of a perfect duplication at such high speed.

My invention will be described in connection with the accompanying drawings and particularly pointed out in the claims.

In the drawings, Figure 1 is a perspective view of the front of the machine. Fig. 1ª is a plan view with parts omitted. Fig. 2 is a plan view of the parts below the pattern and material holders. Fig. 3 is a perspective view of the sliding tables and one of the holders, the part broken away disclosing the devices for adjusting and holding such holders at any particular altitude. Fig. 4 is a side sectional elevation, parts broken away. Fig. 5 is a front elevation of that part of the machine below the upper surface of the pattern and material holders, the part broken away disclosing the mechanism whereby a transverse motion is imparted to the upper sliding table, and the two holders mounted on said table. Fig. 6 is an enlarged plan of the cam whereby transverse motion is imparted to the upper table of the machine and the holders thereon. Figs. 7 and 7ª are enlarged details of the guide finger mechanism. Fig. 8 is a view of one of the guide finger points. Fig. 9 is a plan view of the same. Fig. 10 is a side view of one of the cutters. Fig. 11 is a plan view of the same. Fig. 12 is an enlarged sectional elevation of the frame checking mechanism. Fig. 13 is a side elevation, partly in section, showing the relative positions of the guide finger and a cutter at work.

In the drawings, 100 represents the main frame of the machine which affords a support for the several shafts, tables and auxiliary frames employed in the construction of my machine.

The main shaft of the machine is shown at 10, (Figs. 2 and 4) and on one end of this shaft is mounted a fast pulley 11, ten inches in diameter. In proper position on the shaft 10 is also mounted a three inch gear 12, which engages the twelve inch gear 13, carried by the shaft 14. On the end of shaft 14 adjoining the gear 13 is mounted a disk 15. Across the face of the disk 15 is cut the dovetailed slot or groove 16. In the groove 16 is a wrist-pin 17, held by its head and capable of sliding in the groove 16, when the jamb-nut 18 on said pin is loosened. Held by the wrist-pin 17 is an adjustable pitman composed of the parts 19, 20, 21, 22. When the hand wheel 21 is turned toward the left it unbinds the parts 19 and 20. If then the hand wheel 22 be turned the parts 19 and 20 can slide within each other. After sliding the desired distance the parts can again be bound together by the hand wheel 21.

Held in the piece 20, is the rod or bar 23, having at its upper end the eyes 24, through which passes the wrist-pin 25. The pin 25 also passes through the eye of the lugs 26, thereby connecting the pitman with the double arm swivel frame 27. The arms of this swivel frame are pivoted to the main upper frame work 28 by the pins 29. The pins 30, passing through the forward end of the swivel frame are fastened in the lugs 31, which form part of the slides 32, thus pivoting these slides on the swivel frame. Bolted on the slides 32 is the piece 33. When so bolted the parts 32 and 33 form a strong cross-head pivoted on the swivel frame; and when the frame is in motion sliding up and down in the ways 34.

From the construction above described it will be seen that if the shaft 10 be driven at the rate of five hundred revolutions per minute, the shaft 14 will move at the rate of one hundred and twenty-five revolutions per minute. The crank disk 15 mounted thereon will revolve at the same speed. The pitman, swivel frame and sliding cross head held to the crank disk 15 will consequently reciprocate the same number of times per minute, i. e., one hundred and twenty-five times. The object of the parts above described is to effect a reciprocating motion of the cross head, the purpose of which will be hereinafter described.

Mounted on shaft 14 is another crank disk 35, (Fig. 2) to which is attached by the wrist-pin 36 the pitman 37. The other end of this pitman is pivoted by the pin 38 to the rocking-arm 39. Upon this arm is pivoted the pawl 40, (Figs. 2 and 5) which pawl engages the ratchet wheel 41. Ratchet wheel 41 is mounted on the shaft 42. Upon shaft 42 is mounted the friction wheel 43 covered by the friction belt 44, and at the extreme end of shaft 42 is mounted a six inch bevel gear 45 which engages the four inch bevel 46 mounted on shaft 47. On shaft 47 is mounted the disk 48. Disk 48 has on its upper surface the lugs 49. On the extreme end of shaft 47 is mounted the cam 50, shown in detail in Fig. 6. As seen in Figs. 4 and 5 the six inch bevel 45 also engages the gear 51 mounted on shaft 52, which shaft also carries the four inch miter 53.

Mounted on vertical shaft 54 is the miter 55 meshing with the miter 53. At the upper end of shaft 54 is the cam 56 which is the counterpart of cam 50 on shaft 47. The particular shape of cams 50 and 56 is shown in Fig. 6 and is such, that when revolved by an equally divided intermittent motion, such motion is changed into an equally divided transverse motion of the table upon which they act. These cams act continuously except when their cut away portions are opposite the points 57. The cams act directly upon the screw points which form a part of a slide 58. The points 57 and slide 58 are prevented from moving from the shaft center of such cams, (which might occur from any longitudinal motion imparted to such slide) by the small transverse slot 59, through which projects lug 60, said lug projecting upward from the inner front wall of frame 100.

62 is a bolt sliding in an open faced housing formed on the outer front wall of frame 100. It has on one end the projecting lug 61 and in its middle the pin 63. Pin 63 holds one arm of pitman lever 64. Through the opposite arm of lever 64 passes the pin 65 connecting it with the rocking arm 66, said arm rocking on the forward part of the threaded shaft 67. Through the upper end of arm 66 passes the pin 68 holding the pawl 69. Hinged on the upper end of arm 66 is the rod 70, which rod passes through a hole in the hanger 72. Upon the rod 70 is a spiral spring 71 held compressed between the hanger 72 and the two jam-nuts 77. The pawl 69 engages the teeth of the ratchet wheel 78, said wheel having sixty-four ratchet teeth and being firmly held on the threaded shaft 67.

73 is an adjustable arm pivoted on the pin 74 and held in any desirable position by the set bolt 75 clamping on the segmental lug 76 formed on the frame 100.

With the pitman 37 held three-sixteenths of an inch from the shaft center of crank disk 35 the mechanisms above described will have the following motion: Assuming that shaft 14 revolves at the rate of one hundred and twenty-five turns per minute and that pitman 37 has a three-eighths inch stroke, pitman 37 is pinioned to rocking arm 39 carrying pawl 40 in such manner that the distance traversed by such pawl is exactly equal to stroke of pitman 37. Thus the pawl 40 will at each reciprocating motion be carried three-eighths inch over the ratchet wheel upon which it acts, equivalent to three of the teeth cut in the periphery of said wheel; and thirty-two reciprocations of the pawl will cause one complete revolution of the ratchet wheel and of the shaft upon which it is mounted. The shafts 47 and 54 being geared to shaft 42 in the manner shown will revolve at the same speed. The cams 50 and 56 will make an entire revolution and in such revolution cause a transverse forward and backward motion of one inch of those parts acted upon by said cams. At the same time the lugs 49 on disk 48 will both, in turn, encounter the projection 61, push forward the bolt 62 and pitman lever 64, thereby through the rocking arm 66 carrying backward the pawl 69 and compressing the spiral spring 71. Immediately the lug 49 has passed from contact with lug 61, the spring 71 thrusts forward the pawl 69 which having engaged the teeth of ratchet wheel 78 causes said wheel and the threaded shaft on which it is mounted to turn. The distance through which the compressed spiral spring 71 may turn the threaded shaft 67 is subject to the particular point at which the limit pin 63 may encounter the intercepting adjustable arm 73. The purpose of these motions is, as seen, to rotate the cams 50 and 56 and the threaded shaft 67; the distance of rotation, relative time, intermission, and the objects to be attained thereby will be described hereinafter.

In the rear corners of the frame piece 28 is journaled the shaft 79, carrying driving pulleys 80 and 81. The pulleys are revolved at the speed of five hundred revolutions per minute by a belt running from a counter-shaft to the pulley 80. From pulley 81 passes a quarter turn belt to pulley 82 driving pulley 82 at the same speed. Keyed on the same shaft but above pulley 82 is pulley 83. On the opposite side of the machine but in the same line and altitude is pulley 84. An endless belt 85 passes over pulleys 83 and 84 and is tightly drawn by the adjustable idler 86. In its forward passage one strand of the belt 85 bears against the peripheral faces of a series of spindles 87, said spindles being one inch in diameter and the several constructions being such that when the shaft 79 is driven at the speed heretofore named, the spindles will be driven at the rate of five thousand revolutions per minute.

On the top of main frame 100, I form the ways 88, (Figs. 2, 4, and 5.) In these ways I place the sliding frame or sub-carriage 89, (Figs. 2, 3, 4, and 5) fitted with beveled projecting side piece 90, (Figs. 3 and 5) whereby the sub-carriage 89 fits snugly and slides within the ways 88 in a direction longitudinal with the main frame 100.

Upon the frame or sub-carriage 89, I mount in the ways 91, (Figs. 2, 3, 4, 5) the carriage or frame 92, holding said carriage in the ways 91 by the beveled side pieces as shown. Thus mounted the carriage 92 can slide in a direction at right angles with that of the sub-carriage 89 upon which it is mounted, or, in other words, if a motion longitudinal with the main frame 100 be given to sub-carriage 89 and carriage 92 be also moving in the ways 91, then such motion will be transverse to the main frame 100, or at right angles to sub-carriage 89.

To the inner side of sub-carriage 89 at A, (Figs. 2, 3, 4) I bolt the downward projecting piece 93, the lower part of which consists of the nut 94. The piece 93 is of such shape and so held that the nut forming the lower part thereof fits properly upon the threaded shaft 67. If therefore said shaft 67 be revolved to the right or left the sub-carriage 89 will be carried forward or backward and when so sliding will also carry forward or backward the carriage 92 mounted in slides thereon.

Within the carriage 92 the parts $b, b, b, b$, (Figs. 2, 3, 4 and 5) forming unobstructed ways, permit such carriage to be drawn forward and backward by its sub-carriage 89 without interference on the part of the slide 58. Slide 58 fits snugly within its ways and any longitudinal motion of such slide is prevented by the rigid lug 60 within the small transverse slot or way 59 as heretofore described. As before stated, the sub-carriage 89 is moved in a longitudinal direction by revolving the threaded shaft 67 and when so moving carries in the same direction the carriage 92. Now, if during such motion of sub-carriage 89, the cams 50 and 56 moving between the points 57 held in the slide 58, are revolved with equal speed, the carriage 92 will have both a longitudinal motion because of the motion of the sub-carriage upon which it is mounted and a transverse motion of its own because of such motion on the part of slide 58, due to the operation of cams 50 and 56 thereon. From the above description it will be seen that the object of the devices shown in Figs. 2 and 5 are, first, to impart to the carriage 92 a side and forward motion or motions at right angles to each other; secondly, to control said motions in a manner and for a purpose which will be set forth in describing the operation of the machine. The carriage 92 has on its upper surface the tracks or ways 95, (Figs. 2, 3, and 5.) It is further provided with the rigid upright pieces 96, (Figs. 1, 2, 3, 4, and 5.) Between the uprights 96, I place the holders 97, (Figs. 1, 3, 4, and 5) the width of such holders exactly filling the space between the inner walls of the projections 96 at B. On holders 97 I bolt the pieces 98, bringing one edge of such piece 98 in contact with the ends of the pieces 96 in such a manner that the holder 97 may slide up and down yet not be affected by any longitudinal motion. On the ways 95 I place the movable frame 99, (Figs. 3 and 5.) Said frame 99 has its four corners provided with the inclined surfaces 100$^a$, (Figs. 3 and 5.) Frame 99 is placed under the holder 97 in such a manner that the inclined planes 101, shown on the inner sides of holder 97 are directly over the inclined planes of said frame. On the carriage 92 is bolted the perforated lug 102. Through lug 102 passes the shaft 103 which is held in the position shown by the two collars 104. The shaft 103 passes loosely through a hole in the front cross piece of the sliding frame 99. Its end is threaded and passes through a threaded aperture in the rear cross piece of said frame. Now, when the hand wheel on shaft 103 is revolved, the frame 99 sliding in the ways 95 will cause the holder 97 to gradually rise and it will be held rigidly at any desired altitude. The purpose of the contrivance just described is to provide a mechanism whereby the altitude of both the pattern and material holders may be regulated.

Referring again to the description of the means whereby the spindles 87 are rotated, it will be observed (Figs. 1 and 4) that I place immediately before the said spindles 87 a housing 105. In said housing I place the six roller holders $c, c, c, c, c, c$. Set into the wall of the housing 105 and directly opposite the centers of the roller holders $c$, I place twelve set bolts $d$. By the means of said rollers and set bolts I control the pressure on the belt 85 in such a manner that all of the spindles 87 may be revolved and so that they may be separately adjusted.

In the upper frame piece 28 and cross piece 106 and 107, I place the vertical sliding guide finger and cutter frame 108. All those parts marked $e$ are rigid components of this frame. Said frame carries between the collar 109 and the jamb-nuts 110 the cutter spindle 111. It also carries at C the guide finger tube 112 and through the opening 113 in the upper cross section of said frame passes a rod 114. On said rod is the spiral spring 115 slightly compressed so that it will bear upon the said cutter and guide finger frame, the spring 115 being held between the upper cross piece of said frame and the rigid cross piece 116, (Figs. 1 and 4.) Pinioned by the small bolt 117 is the pivoted arm 118, (Figs. 1$^a$, 4, and 7.)

Attached by the flat spring 119, which forms a part of the arm 118, is the guide finger tube 120, (Figs. 4 and 7.) The end of said guide finger tube is provided with the guide finger points P, shown in elevation and plan views in Figs. 8 and 9. That end of the arm 118, projecting toward the frame 108, is provided with an eye and is pivotally connected with a vertical rod 121, (Figs. 4 and 7.) The upper end of this rod is pinioned to a small swivel frame 122, by the bolt 123, and the frame 122 is itself pinioned on the block 124. The block 124 is vertically adjustable by means of the set bolt 125, as shown in Fig. 12. At D the frame 122 passes through a slot formed in the stem 126. The stem 126 is provided with the valve plate 127 at its lower end. The piston 128 rigidly connected with the guide point and cutter frame by rods 128$^a$ has at its lower end the bucket or plunger 129. Said bucket 129 is provided with ports or openings 130. At the lower extreme of the bucket 129 the cup or pan 131 is attached, as shown in Fig. 12. Said cup or pan 131 is provided with ports or openings $f, f$ and at E the piston carries the collar 132 which firmly holds the leather ring or packing 133.

Turning now to the description of the cutter spindle 111, it will be noticed that its lower end is provided with a clamping sleeve 134 set on the tapered and quartered end of said spindle. The bevel taper of said spindle is of such a degree that when the collar 134 is pushed upward, it will firmly hold the revoluble cutter 135. At its upper end the spindle is also provided with or rather passes through the sleeve-like rollar 87. In the opening in said rollar through which the spindle passes is set a small spline pin 137, this spline pin traversing in a groove cut or formed in the upper section of said cutter spindle. The bearing points of the frame 108 and its various attachments are at $g$. Transversely of the upper frame 28, at F, is bolted the housing 138. Said housing has twelve bore holes so arranged that they may serve as chambers for the pistons 128.

When the machine is in operation, the chambers are filled with water or any liquid of an approaching specific gravity to a height indicated in Fig. 12.

The operation of the cutter frame and the parts attached thereto may be described as follows: When the swivel frame 27 is put in motion, the frame 108 and its attachments will reciprocate in its bearings $g$. It will rise because of the upward motion of the cross bar forming a part of the frame 27 and descend because of its weight and the pressure exerted by the springs 115. During said reciprocation the cutter spindle 111 will slide through the sleeve 81. The piston and bucket will reciprocate within the chamber formed in the housing 138, and the fluid in such chamber will pass upward or downward through the ports 130 and the ports $f, f$, providing the flow of such liquid be not interrupted by an upward motion of the valve plate 127, for if such plate should move upward and rest on the valve seat, (shown in Figs. 4 and 12) the circulation of the liquid would cease and all motion of the frame would be arrested by the liquid compressed below the valve.

In the practical operation of the machine, when the guide point comes in contact with the surface of the pattern it will move upward causing the arm 118, connecting rod 121 and arm 122 to move and close the valve in the bucket and confine the liquid under the bucket, whereupon all downward motion of the frame is arrested. Consequently the function of the guide point is to indicate or govern the depth to which the particular cutter to which it is attached by way of the frame carrying the same shall cut.

Referring now to the construction illustrated, and hereinbefore generally described, I will describe in detail the exact adjustment or adjustments thereof and the effect of such particular adjustment when the entire mechanism is put in motion. For the purpose of duplicating a panel wherein the deepest depression is not more than one inch, the following adjustment is necessary. The wrist-pin 17 holding the pitman head 19 is to be fastened in the slot 16 three quarters of an inch from the shaft center of said disk 16. The pitman head 19 is to remain in the position as shown in the drawings, Fig. 4. When so adjusted the swivel frame 27, when in motion, reciprocates to a distance of one and one-half inches. The wrist-pin 36 holding the pitman 37 to the disk 35 is to be securely bolted three-sixteenths of an inch from the center of shaft 14 so that when said disk 35 is revolved the pitman 37 will have a stroke of three-eighths of an inch, thereby imparting a reciprocating motion of three-eighths of an inch to the pawl 39, thereby rotating the ratchet wheel 41 upon which the pawl 39 acts three-eighths of an inch with every forward motion of the pawl and the ratchet wheel 41 in turn rotating the shaft 42 and through the medium of the gearing heretofore described the disk 48 and cams 50 and 56 the same distance, that is, three-eighths of an inch with every stroke of pitman 37. With ratchet wheel 41 of the size as shown the result will be that the disk 48 and the cams 50 and 56 will make one entire revolution after the pitman 37 has made thirty-two strokes. As a result of the complete revolution of the disk 48 the lugs 49 will operate upon the projection 61 in the manner heretofore described and impart to the threaded shaft 67, two distinct partial rotations, thereby longitudinally advancing the tables of the machine one-thirty-second of an inch at each rotation, provided the adjustable arm 73 is placed in the position as shown in Fig. 5. Should the arm 73 intercept the backward motion of the limit pin 63 at an earlier moment the shaft 67 would rotate to a lesser extent, and, on the other hand should the lever 73 be thrust backward the shaft 67 would as a consequence effect a greater rotation, and consequent upon such changes in the position of lever 73, the longitudinal motion of the tables would be lesser or greater than one thirty-second of an inch.

For the purpose of varying the distance of rotation of the cams 50 and 56, and thereby varying the transverse motion of the carriage 92, the wrist-pin 36 is to be placed nearer to or farther away from the center of the disk 35. In order to cut to a depth of one inch the distance that the frame 108 must traverse is one inch, and, additional thereto that particular distance which the guide point must retreat in order to effect the checking mechanism whereby the advance of such frame is controlled. In the work under consideration the material would be clamped upon the holder immediately under the cutter spindles and the pattern on the holder under the guide point. The material holder would then be raised by the shaft 103 until the material had arrived at an altitude which would permit the cutter to work to the depth of one inch. The pattern holder under the guide finger would be elevated to an altitude sufficient that when the frame carrying said guide finger had reached its highest point when in process of reciprocating, one-sixteenth of an inch of space would intervene between the end of the guide finger and the highest projection on said pattern. The adjusting block 124 can be raised or lowered by means of a set screw 125. If lowered the guide finger must retreat a greater distance in order to close the valve 127. If, on the other hand, the adjusting block 124 be elevated, the backward motion of guide finger will be reduced. Immediately when the machine is put in motion, set bolts $d, d$ in the housing 105 are to be advanced to an extent that will cause the block $c$ to press the friction roller held therein against the face of the belt 85, thereby imparting sufficient friction to the roller 87 to cause the cutter spindles 111 to rotate. With the parts of the machine adjusted as just described, the pattern on the pattern holder and material on the material holder, said holders in their proper position and the carriage 92 in the position shown in Fig. 4, the machine is ready for operation. Immediately with the rotation of the shaft 79 the spindles 111 will rotate, and if proper pressure is brought to bear upon the belt by means of the rollers just described, such spindles will rotate at the speed of five thousand revolutions per minute. The driving pulley 11 having commenced its rotation simultaneously with shaft 79, the swivel frame 27 will be set in motion. The frame 108 carrying the cutter and guide finger will then reciprocate at a speed of one hundred and twenty-five times per minute. Thus the cutter 111 has a reciprocating and rotating motion, and these motions are simultaneous and continued. Simultaneous with the reciprocating motion of the cutter frame, the longitudinal and transverse motion of the carriage 92 and holders 97 carrying the pattern and material sets in. With every intermittent partial rotation of the cams 50 and 56, a transverse motion of the upper table takes place until the cam has made a one-half rotation. Thereupon the table moves backward transversely to its starting point, both motions being of the distance of one inch. Every time the table 92 has traversed either to the right or left one inch, the longitudinal motion, due to the action of the lugs 49, takes place and such table is longitudinally advanced one thirty-second of an inch. In the forward movement the cutter encountering the material is forced into the same and cuts after the manner of a hand drill or bit but with greater speed and precision. If the guide finger does not touch its point against the pattern the cutter will cut into the material the full length of the downward travel of the cross-head upon which the frame rests, and upon which it is forced by the spring 115. So long as the pattern is not within the reach of the guide finger the carrying frame will remain pressed upon the cross-head and reciprocate regularly with it. If the pattern and material have been placed properly, as heretofore described, and have, because of the motion of the table carrying them, passed within the line of travel of the guide finger and cutter, then the guide finger will encounter the face of the pattern with and upon every downward stroke of its frame carried on the cross-head and held thereon by the spring 115. As soon as the guide finger is checked in its advance by encountering a point on the pattern centrally opposite its line of travel and a slight pressure on the point of the finger ensues, the finger will be carried upward, the valve in the checking mechanism closes, the liquid under such valve becomes confined within the limits of the chamber under the plunger, such frame will come immediately to a stand still or be "checked." It can neither advance nor rebound. The cross-head will continue its downward travel and upon its return the frame will be again elevated, as an upward motion of the frame will permit a downward motion of the guide point and a consequent reopening of the valve 127. It will be seen from the above description that the function of the guide finger is to indicate, in conjunction with the pattern, when such guide finger touches the pattern, the relative or corresponding point at which the particular cutter connected therewith shall cease to cut into the material operated upon. It is the governor of the reciprocating motion of the cutter in so far as it controls the distance of the advancement of its carrying frame during each reciprocating motion. The distance of the advancement of course governs the depth of cutting as there can be no contact of the cutter with the material except during the downward passage of the cross-head and carrying frame, and while the frame is held upon the cross-head by the spring 116.

It is understood that each machine is provided with a series of these frames, cutters and guide points; that they all act in the same manner and the action and motion just described occurs with each finger, frame and cutter at each forward motion, but the point of advance whereat any particular cutter will cease to cut depends entirely upon the contour of the pattern which may at that particular time stand within the reach of its guide finger. Thus the greatest projection upon the pattern will cause the guide finger above it to check its frame first, the lesser projections later and the deepest depression calling for the deepest cut into the material on the part of the cutter will naturally be the last surface encountered by any guide finger opposite it. The twelve or more cutters or bits revolved by the spindle rollers 87, make as many incisions, and effect these incisions at the rate of about two per second. Therefore when using as in the case assumed a cutter having a one-sixteenth of an inch point, the edges of these incisions will overlap at their upper and lower extremities one-thirty-second of an inch upon each repetition of such incision and this overlapping of the incisions will continue during the operation of the machine, both longitudinally and transversely. When the table has advanced to a point where the rear end of the pattern and the material have passed beyond the line of guide points and cutters the work is finished with the exception of a regularly distributed surface granulation, which will be more or less pronounced, depending upon the size of the cutter point and greater or less intermittent advances of the tables. If a very smooth finish is desired the distance of the intermittent advance of the table must be reduced in a manner as heretofore described and a cutter with a fine point should be employed. If working on a large design a deep cut, advance of greater distance, and cutters with larger points should be used.

Reference has previously been made to the faculty of shortening or lengthening the distance through which the valve plate 127 must travel in order to close plunger 129 and thereby arrest the downward motion of the frame 108. The purpose of such adjustment is as follows: After placing a series of drills into the cutter spindles 111 and holding them by means of friction collars 134, if it should then be discovered that such cutters are not all of equal length whereby an uneven surface would be produced in the duplicate, such unevenness may be regulated by the adjuster 124. If any particular drill, because of its greater length, should cut too deep, this may be remedied by raising the adjusting block 124, whereby the valve 127 will arrest the downward motion of the frame 108 at an earlier period. But, on the other hand, should any cutter, because of insufficient length, not cut to the desired depth, the regulating block 124 on the frame holding such particular cutter can be lowered, thus causing the slower closing of valve 127 and the consequent deeper cut of that particular drill; or, in other words, whatsoever slight deviations may exist in the particular length of the drills may be compensated by raising or lowering of the adjuster so that such drills when the guide finger points operate upon a perfectly plain surface will reproduce such surface perfectly. If any defect in the material or any defect due to the action of the cutters should appear in the duplicate the entire surface may be re-cut by raising the material holder to a height equal to the depth of such defect. It will of course be understood that the speed at which the cutters revolve and reciprocate should be varied to suit the particular material worked upon, the speed heretofore mentioned being an average speed for hard wood. After the duplicate is finished a new piece of material or pattern is placed and then the table is returned to an operative position by applying a crank or winch to shaft 67.

A distinguishing characteristic of the machine above described is such a construction and arrangement of the mechanism that the guide finger upon coming in contact with the pattern is made to actuate mechanism whereby the further movement of the guide finger and tool toward the pattern and work respectively is arrested.

Other inventors have employed tracing fingers to control the action of the tool, but such fingers have been rigidly connected to the tool carrier. In such machines the upward and downward movements of the tool have been due solely to the contour of that part of the pattern beneath the guide finger. In other words, the projection upon the pattern coming in contact with the finger raises it thus raising the tool, while the downward movement is due entirely to the descent in the contour of the pattern.

In the machine above described it will be observed that there are provided a series of frames each carrying a guide finger and a revoluble cutter, each of the frames being adapted to reciprocate and their downward movement commencing simultaneously and at regular intervals; that upon a contact of any one of the series of guide fingers with a projection upon the pattern a checking mechanism, controlled by the guide finger, arrests the movement of the frame carrying such finger and the frames so arrested remains stationary until the several frames have completed their downward movement, whereupon the series of frames are returned to their normal position by mechanism independent of the pattern.

From the above it will be apparent that the law of this machine is: The several frames complete a reciprocation in like times; that the series begin this reciprocation at the same time and at regular intervals; that the several individual frames of the series are capable of being arrested dis-simultaneously and correspondingly to the contour of that portion of the pattern with which their guide fingers come in contact and that finally when the entire series have performed their respective irregular reciprocations, due to the particular part of the pattern with which their guide fingers contact, the entire series are raised to their normal position. To apply this law to the mechanism which I employ, the principle of the machine may be stated as follows: The cross head reciprocates at regular intervals and through a regular distance, and the series of frames have the same tendency but this tendency is overcome by the action of the respective guide fingers encountering the various parts of the pattern so that the downward movement of the several frames may be arrested at irregular times, and that finally when the entire series of frames have been arrested the upward movement of the cross head restores all of the frames to their normal position.

It is essential to the practical and successful operation of a machine of this character that the guide fingers and cutters should partake of this definite reciprocation, as contradistinguished from the rising and falling movement due to sinuosities of the pattern upon which a rigid guide point travels. In other words, the difference between this type of machine and those older in the art is the difference between an ordinary tracer requiring the attention or direction of an operator and a machine purely automatic in its operation and which has the capability of duplicating not only undulating lines but the angles in patterns which it is desired to reproduce. It will be seen that after the machine has once been properly adjusted the work of the attendant is limited to placing the material upon the holder and keeping the machine lubricated, the several movements necessary to duplicate the pattern being entirely automatic.

I claim—

1. In an automatic duplicating machine, the combination with horizontally arranged material and pattern holders, each having two movements in the same plane angular with reference to each other, a series of vertically arranged revoluble cutters or bits, a guide finger operatively connected with each cutter or bit, means for imparting the described movements to the pattern and material holders and means for revolving the cutters and for moving the cutter and guide finger to and from the material and pattern respectively, substantially as described.

2. In a duplicating machine, the combination with horizontally arranged pattern and material holders means for shifting said holders both horizontally and transversely, a series of independent frames each having mounted therein a revoluble cutter and a guide finger, a vertically reciprocating cross head adapted to support the series of frames and means controlled by the guide fingers for arresting the downward movement of the frames independently of each other upon contact of their respective guide fingers with the pattern, substantially as described.

3. In an automatic duplicating machine, the combination with horizontally arranged pattern and material holders, of automatic mechanism for moving said pattern and material holders horizontally and transversely, a series of vertically arranged frames each provided with a revoluble cutter and a guide finger, a cross head adapted to support the series of frames, and a series of checking mechanisms actuated severally by the guide fingers upon contact with the pattern to arrest the downward movements of the frames and the action of the cutters, substantially as described.

4. In an automatic duplicating machine, the combination with pattern and material holders, of a series of independently movable frames each provided with a revoluble cutter and a guide finger, a cross head for supporting the series of frames and a series of springs bearing upon the frames and normally tending to move them toward the work, substantially as described.

5. In an automatic duplicating machine, the combination with pattern and material holders, of a series of independently movable frames each having a cutter revolubly mounted therein and a guide finger having a sliding movement independent of the frame, a reciprocating cross head adapted to support the series of frames and means whereby to impart a reciprocating movement to the cross head and frames, substantially as described.

6. In an automatic duplicating machine, the combination with pattern and material holders, of a series of independently movable frames each having a cutter revolubly mounted therein and a guide finger having a sliding movement with reference to the frame, a reciprocating cross head adapted to support the series of frames, a walking beam pivoted to the cross head, gearing for oscillating said beam whereby to impart a reciprocating motion to the cross head, and means controlled by the guide fingers for checking the descent of the frames, substantially as described.

7. In an automatic duplicating machine, the combination with the cutting tool, of a guide finger operatively connected therewith and controlling by its contact with a pattern the action of the tool, and a checking mechanism comprising a fluid chamber, a piston reciprocating within said chamber, a port or passage connecting the portions of the chamber above and below the piston and a valve mechanism connected with the guide finger and adapted to control said port or passage, substantially as described.

8. In an automatic duplicating machine, the combination with a cutting tool, of a guide finger operatively connected therewith and controlling by its contact with a pattern the action of the tool, and a checking mechanism comprising a fluid chamber, a piston reciprocating within said chamber, a port or passage through said piston and a valve connected with the guide finger and controlling said port or passage, substantially as described.

9. In a duplicating machine, the combination with the cutting tool and a guide finger for controlling the action of the tool, of a checking mechanism controlled by the guide finger, said checking mechanism comprising a fluid chamber, a piston reciprocating therein, a port or passage through said piston, a valve to control said port or passage and having its stem connected with the guide finger, and a chamber connected with the piston and to which the fluid has access, substantially as described.

10. In a duplicating machine, the combination with a series of cutting tools and their controlling guide fingers, of a checking mechanism for the respective guide fingers and controlled thereby, and means for adjusting said checking mechanism whereby uniformity of action of the several guide fingers and cutters may be secured, substantially as described.

11. In a duplicating machine, the combination with a reciprocating frame, of a cutting tool and a guide finger carried thereby, a checking mechanism controlled by the guide finger, said checking mechanism having a pivoted arm carrying a spring latch thereon and the guide finger having a notch to receive said latch, substantially as described.

12. In a duplicating machine, the combination with a frame carrying a cutter and a controlling guide finger, of a checking mechanism controlled by the guide finger, a sleeve wherein said guide finger is mounted and a spring latch carried by the checking mechanism and adapted to enter notches in the sleeve and guide finger whereby to connect them with the checking mechanism, substantially as described.

13. In a duplicating machine, the combination with a series of cutters or drills having driving spindles, of a belt running in contact with the spindles and a series of belt tightening rolls, said rolls being independently adjustable, substantially as described.

14. In a duplicating machine, the combination with a series of cutters, of spindles to which the cutters are connected, sleeves through which said spindles may slide and a belt running in contact with the sleeves whereby to drive the spindles, substantially as described.

15. In a duplicating machine, a series of cutting points and spindles to which said cutting points are secured, said spindles having sockets whose walls are split and tapered, and clamping sleeves for securing the shank of the cutter within the socket of the spindle, substantially as described.

16. In a duplicating machine, the combination with a cutter, of a guide finger operatively connected therewith, said guide finger and cutter being of the same external diameter, and said guide finger having a series of circumferential steps in its periphery, substantially as described.

17. In a duplicating machine, the combination with a reciprocating frame carrying a cutting tool, a cross head for moving said frame, a walking beam for reciprocating the cross head and a pitman for driving the walking beam, and gearing for driving the pitman, substantially as described.

18. In a duplicating machine, the combination of a series of vertically reciprocating frames carrying connected cutters and guide fingers, a cross-head for moving said frame in one direction, a swivel frame pivotally connected to the cross-head, a pitman and means for operating the pitman, substantially as described.

19. In a duplicating machine, the combination of a series of vertically reciprocating frames carrying connected cutters and guide fingers, a cross-head for moving said frames in one direction, a swivel frame pivotally connected to the cross-head, a pitman constructed with two members adjustable upon each other and means for locking them in their adjusted position, substantially as described.

20. In a duplicating machine, the combination with vertically operating cutters, of a carriage for the pattern and material holders, said carriage having alternate longitudinal and transverse movements, and means for moving the holders, substantially as described.

21. In a duplicating machine, the combination with vertically operating cutters, of a carriage for the pattern and material holders, said carriage having alternate longitudinal and transverse movements, and said pattern and material holders being vertically adjustable, and means for imparting said movements to the carriage and for adjusting said holders, substantially as described.

22. In a duplicating machine, the combination with a carriage for the pattern and material holders, of a cam for moving said carriage, said cam having an acting face adapted to impart equal transverse movements to the carriage when rotated in equal times, and having a portion of its acting face cut away whereby it is rendered inoperative during the longitudinal movement of the carriage, substantially as described.

23. In a duplicating machine, the combination with a horizontally and transversely moving carriage, of a cam for moving the carriage transversely of a sliding frame in which the cam acts, said frame being free to slide transversely in ways on the carriage and a second frame also adapted to slide transversely and to lock the first mentioned frame against longitudinal movement, substantially as described.

24. In a duplicating machine, the combination with the carriage for the pattern and material holders, of a shaft having a cam thereon for moving the carriage transversely, a disk provided with lugs equidistant thereon, a sliding bolt adapted to be engaged by said lugs and connected to a rock arm, a pawl connected to said rock arm, a spring adapted to be compressed by the rocking of said arm, a worm shaft engaged with the table and a ratchet mounted on said shaft and adapted to be engaged by the pawl, whereby when the bolt is released the reaction of the spring will cause a rotation of the worm shaft and the longitudinal movement of the table, substantially as described.

25. In a duplicating machine, the combination with a carriage for the pattern and material holders, of means for moving said carriage transversely, of gearing for moving said carriage longitudinally, said gearing comprising a worm shaft engaged with the carriage and having a ratchet, a pawl for turning the ratchet, a rock arm to which said pawl is pivoted, a spring adapted to be compressed by the rocking of said arm, a sliding bolt connected to the rock arm and having a limit pin thereon, a rotatable disk having lugs to engage said bolt, and an adjustable stop to engage said limit pin whereby the longitudinal movement of the table may be regulated, substantially as described.

ROBERT MORGENEIER.

Witnesses:
C. C. LINTHICUM,
FREDERICK C. GOODWIN.